(12) United States Patent
Kia et al.

(10) Patent No.: US 9,140,615 B2
(45) Date of Patent: Sep. 22, 2015

(54) METHOD AND SYSTEM FOR MEASURING PORE-FLUID PRESSURE

(71) Applicants: Mohammadali Kia, Edmonton (CA); David Sego, Edmonton (CA); Norbert Morgenstern, Edmonton (CA)

(72) Inventors: Mohammadali Kia, Edmonton (CA); David Sego, Edmonton (CA); Norbert Morgenstern, Edmonton (CA)

( * ) Notice: Subject to any disclaimer, the term of this patent is extended or adjusted under 35 U.S.C. 154(b) by 0 days.

(21) Appl. No.: 14/264,442

(22) Filed: Apr. 29, 2014

(65) Prior Publication Data
US 2014/0318262 A1 Oct. 30, 2014

Related U.S. Application Data

(60) Provisional application No. 61/816,879, filed on Apr. 29, 2013.

(51) Int. Cl.
*G01B 5/00* (2006.01)
*G01L 1/24* (2006.01)
*E21B 47/06* (2012.01)

(52) U.S. Cl.
CPC ............. *G01L 1/242* (2013.01); *E21B 47/06* (2013.01)

(58) Field of Classification Search
CPC ......... G01L 1/242; G01L 11/02; E02D 1/027; E21B 47/06; G01N 15/08
USPC ............................................ 73/760, 784, 800
See application file for complete search history.

(56) References Cited

U.S. PATENT DOCUMENTS

| | | | |
|---|---|---|---|
| 3,935,745 A * | 2/1976 | Jonell et al. | 73/704 |
| 4,150,578 A * | 4/1979 | Swartz | 73/725 |
| 4,445,788 A * | 5/1984 | Twersky et al. | 374/142 |
| 4,517,842 A * | 5/1985 | Twomey et al. | 73/701 |
| 5,804,715 A * | 9/1998 | Bennett | 73/170.32 |

* cited by examiner

*Primary Examiner* — Max Noori
(74) *Attorney, Agent, or Firm* — LeClairRyan, a Professional Corporation

(57) ABSTRACT

A method for measuring pore pressure is provided using a rigid piezometer that does not need a filter and can be used to measure pore-water pressures in partially frozen soils. This method also can be used to measure pore pressure in a porous media when the hydraulic conductivity of the porous media is low or there is limited amount of pore-fluid available to transfer the pressures. A piezometer is also provided, including: a tube for hydraulic fluid; first and second valves to control fluid flow in the tube and into a porous medium; and a fitting wherein a pressure sensor is positioned to measure fluid pressure in the hydraulic fluid in the tube and a hydraulic fluid droplet ejected from an end of the tube into the porous medium; and an interface of the hydraulic fluid with the pore-fluid within the porous medium, using the droplet placed into the porous medium. The tube (or part of the tube), valves, fittings, and pressure sensor may be enclosed in a housing.

15 Claims, 5 Drawing Sheets

Figure 2.a
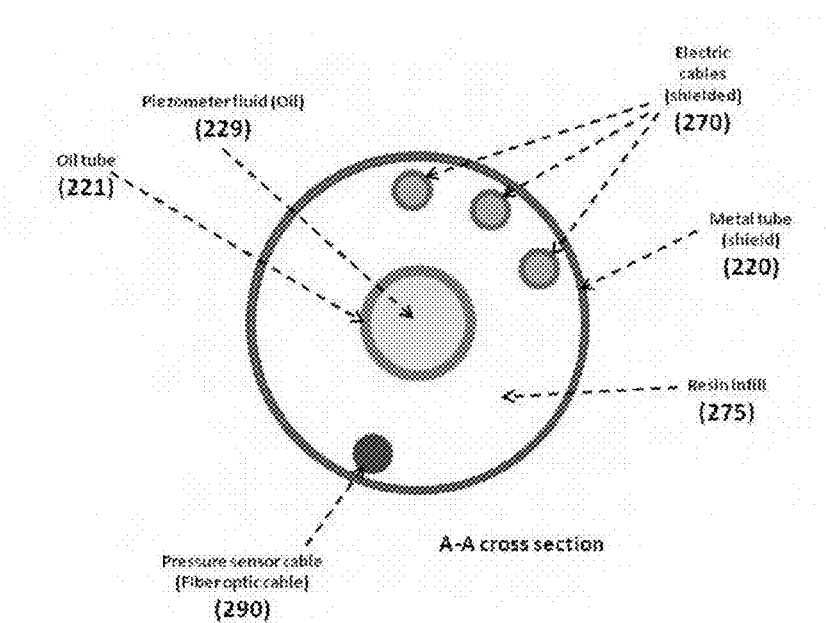
Figure 2.b
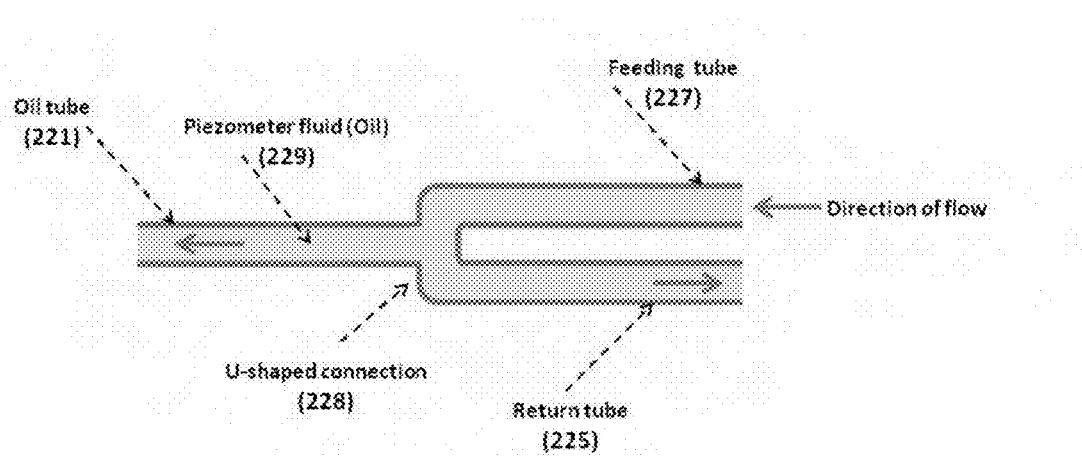

METHOD AND SYSTEM FOR MEASURING PORE-FLUID PRESSURE

This application claims the benefit of U.S. Provisional Patent Application No. 61/816,879 filed Apr. 29, 2013, which is hereby incorporated by reference in its entirety.

FIELD

This invention relates to measurement of pore-fluid pressure, and more particularly to measurement of pore-water pressure in partially frozen soils.

BACKGROUND

If no water occupies soil pores, there will be no geotechnical challenges during freezing, thawing, or issues with pore ice in the soil. Engineers are interested in applied stresses (positive and negative pressures) to evaluate resistance and deformations of materials. Hence, to correctly understand the mechanics of freezing and thawing of the soil, as well as, the behavior of partially frozen soil under applied loads, it is important to first measure and understand the behavior of the pore-water pressures and their distribution within the freezing, thawing, and partially frozen soils.

When a saturated coarse-grained soil freezes, the pore space gradually fills in; hence, the soil's hydraulic and mechanical behavior change due to the phase change of water into ice within these voids. The ice matrix increases the apparent cohesion and tensile strength, and reduces compressibility and hydraulic conductivity of the soil and therefore the soil's behavior becomes more like a cemented soil or rock.

There are several challenges in measuring pore-water pressure in partially frozen soils, including: 1. Low hydraulic conductivity in the partially frozen state; 2. Continuity and availability of the unfrozen water phase; 3. Thermal effects; 4. Existence of two solid phases (ice and soil grains; 5. Time and temperature dependency of stiffness and volume of the ice matrix; and 6. Pressure melting of the ice phase under increase of effective stress or pore-water pressure and ice formation under decrease of pore-water pressure in super cooled pore-water, or decrease of temperature, or salinity of pore-water.

Increasing demands for exploiting energy and mining resources in cold climates and transportation demands in climates such as Northern Canada, need reliable engineering theories and techniques to provide safe, economical design for infrastructures required by these projects. Further, economical extraction of resources and their transport require improved engineering to reduce the costs. In addition, potential warming associated with climate change contributes to deepening active layer which may increase geohazards risks: avalanches; earth slides, falls and flows; and deglaciations. About 50% of the land in Canada is underlain with permafrost, and global warming may therefore be a security issue because of the potential geohazards that may affect the environment as well as engineering projects (highways, pipelines, railways, infrastructure, and forests). Most of the rest of Canada is underlain by seasonally freezing and thawing ground and may be affected by frost heave, thaw weakening, and thaw settlement. Freezing and thawing induced deformations affect the serviceability and durability of highways and railroads; chilled gas pipelines; oil pipelines; municipality and communication infrastructures; and all other engineering structures in areas with cold climates. Measuring pore-water pressures in partially frozen soils is of paramount importance in effective analysis and design for such applications.

The cost associated with damages induced by freezing and thawing is high. Hence, there is a need to focus on practical approaches to minimize these new and ongoing costs by determining the pore-water pressure in such partially frozen soil.

Measuring pore-water pressures in freezing and thawing soils is also of practical significance in engineering artificial ground freezing for controlling groundwater seepage and contamination transport, structural support of deep and shallow excavation, and liquid natural gas (LNG) storage.

Modern soil mechanics was born with the advent of the concept of effective stress analysis and design. Conducting effective stress analysis using effective stress material properties provides a more realistic representation of the field behavior of the ground and leads to more accurate, safer, and cost effective designs. To evaluate effective stresses and effective stress material properties in partially frozen soil, measuring pore-water pressure distribution within these soils is required. Measuring pore-water pressure distribution is also required to measure hydraulic conductivity and hydraulic gradients in these soils. Measuring pore-water pressures in partially frozen ground is more complicated than in thawed soil as phase change (ice melting or formation) occurs due to time dependent heat and mass transfer. Further, pressure melting of ice and formation of ice from super cooled water when pressure is reduced, increase the complexity of the behavior of partially frozen soils. These processes occur near freezing temperature of pore-fluid, for example 0° C. for water, and within the pressure range of interest for engineers. They result in viscous deformations, anisotropy, heterogeneity, and damage mechanisms that influence the deformation and strength response of the partially frozen soils.

The major obstacles in setting up the effective stress concept in partially frozen soils have been the difficulty of conducting reliable, accurate measurements of unfrozen pore-water pressures in partially frozen soils.

Therefore, 'creep deformation constitutive models' and 'creep failure criterions' have been historically used for analysis of the behavior of soils at subfreezing temperatures. Conducting creep tests to seamlessly simulate field conditions is time consuming and expensive. Further, the existing creep methods do not consider pore pressure generation and dissipation and do not consider effective stresses. In reality, 'effective stresses' and 'effective stress material properties' control the resistance and deformation of the soil masses and therefore the existing creep methods are not an effective way for analysis of resistance and deformation of partially frozen soils.

A saturated soil consists of soil grains and water. If there are no soil grains, water will carry the entire load (like a ship floating on water). If there is no water, the soil skeleton will carry the entire applied load. Pore pressure equations evaluate what portion of the load will be carried by the water phase when water is present and has not escaped from the voids between the soil grains. Knowledge of the pore-water pressure is needed to assess the 'flow' of water through a porous material and to predict the 'effective stress' that controls its resistance and deformation. Therefore, measurement of, and having methods for estimating the pore-water pressure response to the applied loads are desirable. Piezometers were developed to measure these pore-water pressures. Pore pressure equations, on the other hand, provide the estimation methods. The previously developed piezometers were developed for applications in thawed soils and lack the essential requirements for measuring pore-water pressures in partially frozen soils.

The term 'hydraulic fluid' is used in mechanical engineering and refers to the medium through which power is transferred. Hydraulic machines work more efficiently if the hydraulic fluid has 'low compressibility'. Other major properties of the hydraulic fluid for power transfer and control are 'fast air release', 'low foaming tendency', 'low air entrainment', 'high lubricating properties', and 'low total compressibility'. It is also desirable that the hydraulic fluid should not chemically react with, or otherwise alter, the medium that it is contained in. Air in a liquid can be in the form of 'dissolved air' or 'entrained air' (air bubbles of various sizes and foam). Even a small volume 'air bubble' present in the fluid can radically alter the compressibility of the fluid. Free air that can have independent pressure of the liquid is treated as an independent phase. In previously developed closed-system piezometers, the pore-pressures are transferred to a transducer in the piezometer through a fluid (which is referred to as "piezometer fluid", which generally has been water) and through a filter. In open-system piezometers the pore-fluid in the soil just enters inside the piezometer (for example in a standpipe) through a filter. In these previous designs, the filter has been used as an interface between the piezometer and the soil and the piezometer design has been based on the concept that the piezometer fluid is behind this interface.

If there is no air in the liquid, the compressibility of the liquid is equal to its pure substance compressibility (primary compressibility). In contact with air, some of the air dissolves into the liquid or comes out of solution due to thermal or pressure variations; increasing the compressibility of the liquid (added secondary compressibility). However, at any specific pressure and temperature, only a limited amount of air can dissolve in a liquid. Therefore, the volume change of the part of the entrained air that remains as air bubbles in the liquid follows the gas law when subjected to pressure or temperature changes. The pressure and temperature in the air bubbles are in (or will reach) equilibrium with that in the liquid and the volume change of these air bubbles add to the compressibility of the liquid (added tertiary compressibility).

In a saturated soil, some of the 'liquid water' turns into 'water vapor' during the stress wave transition period of an unloading scenario. Further, dissolved air in water may come out of solution (release) when its pressure is reduced. Water vapor and the released air can create a 'gas bubble'. The result will be a more "compressible" fluid. Further, this 'gas bubble' reduces the hydraulic conductivity of the soil for fluid flow and hence volume transfer of water required to transfer the new stress state is delayed. The water vapor bubbles, or water vapor in humid air bubbles, may partially turn into liquid water after the wave transition period. The amount of water vapor as 'gas bubble' in pore-water depends on the vapor pressure of water, which is a thermodynamic property (depends on temperature and pressure). During loading, more of the water vapor turns into liquid water and hence increases the rigidity of the liquid, as well as, hydraulic conductivity of the soil for water flow leading to faster pressure equalization. Cavitation in water in the form of 'water vapor bubbles' can be observed with the naked eye when water pressure approaches approximately −90 kPa. In unsaturated soils, the volume of the air bubbles increases with a reduction of the stress (in a manner similar to ideal gas law), hence it reduces the hydraulic conductivity of the soil and increases pressure equalization time.

Traditionally, piezometers with filters have been used to measure pore-water pressures. Based on the classic literature, the roles of filters in piezometers are to: 1. Separate the pore pressure from the total pressure in a soil, by transmitting pressure to the transducer only through the fluid in the measuring system; 2. Maintain the rigidity of the piezometer by eliminating (or minimizing) air from entering the measuring system. In some piezometer systems, flushing of the piezometer fluid is required before each reading; and 3. Independently measuring pore-air and pore-water pressures in an unsaturated soil, only when air and water pressures differ significantly. Generally, "low air entry" and "high air entry" filters are used to independently measure pore-air and pore-water pressures, respectively.

Continuity and hydraulic connection between the pore-water in the soil and the fluid that transmits pressure to the sensing element (transducer) in the piezometer is necessary to measure pore-water pressures correctly.

Even a high air entry filter does not prevent diffusion of air into the piezometer fluid, and the diffused air is in the form of "gas in solution". Gas in solution may be released (because of agitation or increase in temperature) and coalesce into 'gas bubbles'. These air bubbles accumulate and get trapped behind the filter (and within the piezometer system) and introduce error in the measured pore-water pressures.

Use of filter can delay and alter the pore pressure response of the piezometer, reduce its reliability, increase its flexibility, and cause loss of hydraulic connection between the piezometer fluid and the pore fluid in partially frozen soils. A flexible piezometer softens the pore fluid phase and hence alters the pressure being measured. Furthermore, in partially frozen soils where a small volume of unfrozen pore-water is available to transfer the pressures, rigid piezometers are required because they need only a very small volume of liquid to transfer the pressures.

SUMMARY

A piezometer is provided, including a housing; means to place the interface of the piezometer fluid with the pore-fluid into a porous medium (for example through injecting a droplet of piezometer fluid into the porous medium); and means for determining the pore pressure as the pore pressure is transferred to the piezometer fluid. A filter component is not required but in some applications a filter might be used.

When the piezometer is used for measuring pore pressures at subfreezing temperatures of the pore-fluid, the piezometer fluid should not freeze at a freezing temperature of the pore-fluid (temperatures below the temperature at which the pore-fluid would freeze when it is not within the porous medium). The piezometer fluid also should not affect the freezing temperature or the chemistry of the pore fluid. For measuring pore-water pressure in partially frozen soils, the piezometer fluid should not freeze at temperatures of interest below 0° C. The mineral oil, used as hydraulic fluid in one of the FRP prototypes of this invention, does not freeze at temperatures below 0° C. down to −30° C., is not toxic, and does not change the chemistry of pore-water for geotechnical engineering purposes (for example as compared to alcohol or glycol).

When the piezometer is used to measure negative pore-liquid pressures, the piezometer fluid should be able to sustain negative pressures less than cavitation pressure of the pore-fluid. When the pore-liquid is water, the piezometer fluid should sustain negative pressures less than the cavitation pressure of water (for example less than about −90 kPa at 20° C.) without cavitation. The mineral oil, used as hydraulic fluid in one of the FRP prototypes of this invention, can sustain negative stresses of less than −500 kPa.

The piezometer should be rigid, which is accomplished by one or more of the following means: miniaturized components to minimize the volume of piezometer fluid inside the housing; wherein the means for determining the pore pressure is a miniature transducer such as a miniature fiber optic pressure sensor or other type of transducer that requires a small amount of volume transfer to measure the pressures; the piezometer fluid is a hydraulic fluid, wherein a droplet of the piezometer fluid that is placed in the porous medium and at the tip of the piezometer (that is in the porous medium) prevents air or gas from entering the piezometer (this droplet may be placed via injecting the droplet into the porous media); wherein the piezometer fluid transfers the pressures to the measuring transducer via a tube having a smooth interior; or wherein the piezometer is thermally insulated and/or has a thermal mass to delay and/or to dampen thermal fluctuation effects on the means for determining pore pressure.

Another piezometer is provided, including: an oil tube; first and second valves to control oil flow in the oil tube and into a porous medium; a housing, a T connection within the housing wherein a pressure transducer/sensor is positioned to measure oil pressure that is connected to the oil in the oil tube and an oil droplet ejected from an end of the oil tube into the porous medium; and an interface of oil with pore fluid (water, etc.) within the porous medium, using the oil droplet injected into the porous medium (i.e. the interface of the oil droplet and the pore-fluid).

The volume of the oil droplet should be three to five times the volume that is required to transfer the pressures. The oil droplet prevents flow of free air into the oil tube. After the oil tube is filled with oil, both first and second valves are opened and an oil droplet is injected into the porous medium using a syringe pump. After the oil droplet is injected, the first valve is closed and the second valve stays open so that the pressure sensor is hydraulically connected to the oil droplet and measures the pore pressure in the porous medium. The piezometer should be insulated by insulation and encapsulated in a thermal mass to delay and dampen thermal fluctuations. Insulation or thermal mass may be used alone in some applications.

Another piezometer is provided, including: a housing, the housing having an insulating layer, and first and second airtight openings, a tube for transmission of oil, the tube ending at the first airtight opening or extending to reach the measuring point, the tube passing through the second airtight opening; first and second valves within the housing, positioned on the tube, the first and second valves configured to control a flow of oil in the tube; an integrated circuit within the housing configured to control the first and second valves; and a fiber optic pressure sensor within the housing configured to measure pore pressure, the pressure sensor in communication with a data acquisition system by means of a fiber optic cable passing through the second opening. The housing may be cylindrical or ovoid shaped. The piezometer may have a third valve positioned on the tube configured to control oil flow through the tube. The housing may have first and second metallic layers and the insulting layer may include a vacuum between the first and second metallic layers.

In operation, the first valve opens to allow oil to flow to the tube ending at the first opening, and the second valve closes to prevent the oil flow from returning, thereby causing the oil in the oil tube to hydraulically connect an oil droplet outside the housing with the transducer and hence allow measuring pore pressures.

The housing may be positioned within a driving cone, the first opening positioned at a corner of between first and second ledges of the cone, the second ledge positioned below the first ledge. The cone is positioned in the ground by means of a driving pipe, the driving pipe having a flange shaped to cover the first opening during driving. The cone may include a storage tube, the storage tube housing the oil tubes, the fiber optic cables, and the electrical cables from the piezometer to a surface. The driving pipe may include a second pipe for transmission of grout. The housing may be positioned in the cone such that the first opening is connected to an end of a tube and the tube may include a one way valve at its other end that opens into the porous-medium. In this case the oil droplet will be placed into the porous media through the one way valve at the tip of the tube.

A method of controlling piezometer fluid flow in a piezometer is provided, including: providing a tube having a first valve and a second valve with the piezometer, the tube allowing passage of piezometer fluid from a piezometer fluid source to a first end of the tube positioned in a porous media; electronically opening the first valve to allow passage of oil to the first end of the tube; electronically closing the second valve to prevent oil from returning from the soil; and short circuiting said first and second valves to prevent change in the valves from electromagnetic interference. The piezometer may be enclosed by a housing having an inside layer and an outside layer, and a vacuum between the inside layer and outside layer. The inside and outside layers may be made of metal or other conductive material and may have an ovoid or cylindrical shape to further protect the piezometer against electromagnetic interferences. A third valve may be provided, duplicating the open or closed status of the second valve.

A method of measuring pore pressure is provided including: inserting a tube into a porous medium; injecting a droplet of hydraulic fluid from the tube into the porous medium; and measuring the transferred pressures from pore pressure in said porous medium to the hydraulic fluid.

A method of controlling piezometer fluid flow in a piezometer to eject a droplet into a porous medium is provided, including: providing a tube having a first valve and a second valve, the tube allowing passage of piezometer fluid from a piezometer fluid source to a first end of the tube positioned in a porous media; closing the first valve and opening the second valve, the second valve connected to the piezometer fluid source that has a controlled pressure X (such as a syringe pump), and a pressure X is applied to the piezometer fluid contained in the piezometer while the second valve is open and the first valve is closed. Then the second valve is also closed and the piezometer fluid is locked in the piezometer and has a pressure Y approximately equal to X. The pressure Y can be greater than the maximum pressure that is intended to be measured by the piezometer, must be less than the maximum allowable pressure for the piezometer, and must be greater than the existing pore pressure in the porous media. The first valve is opened and hence the piezometer fluid is allowed to flow out of the tube into the porous medium and some of the piezometer fluid is ejected into the porous medium (to generate a droplet); hence, the piezometer fluid can reach pressure equilibrium with pore fluid pressure. The first valve is then closed and the second valve is opened so that piezometer fluid inside the piezometer reaches pressure X again, and the above procedure for ejecting a droplet is repeated until the required volume of droplet is generated at the tip of the tube that is in the porous medium. For a droplet volume that is three to five times the required volume transfer to measure the pressures, the above procedure for droplet ejection should be repeated three to five times, respectively.

BRIEF DESCRIPTION OF THE DRAWINGS

FIG. 2.*a* is a cross section view along A-A of FIG. 2, of a tube used therein.

FIG. 2.*b* is a schematic view of U-shaped connection of oil tube to the feeding and return tubes that are used for de-airing the feeding oil line.

DETAILED DESCRIPTION

The system and method according to the invention offer improvements to currently available piezometers by providing a filterless rigid piezometer ("FRP").

In this document, piezometer fluid is a hydraulic fluid and can be oil or other kind of piezometer fluid, pore fluid can be water or other kind of pore fluid, and porous media can be soil or other kind of porous media; the terms oil, water, and soil have been used interchangeably instead of piezometer fluid, pore fluid, and porous media, respectively, without limiting the kind of piezometer fluid, pore-fluid, or porous media, respectively. Further, pressure transducer or sensor can be a miniature fiber optic pressure sensor or any other kind of pressure transducer that requires only a small amount of fluid transfer to measure pressure. The term fiber optic sensor has been interchangeably used instead of such pressure transducers.

Figure 1:
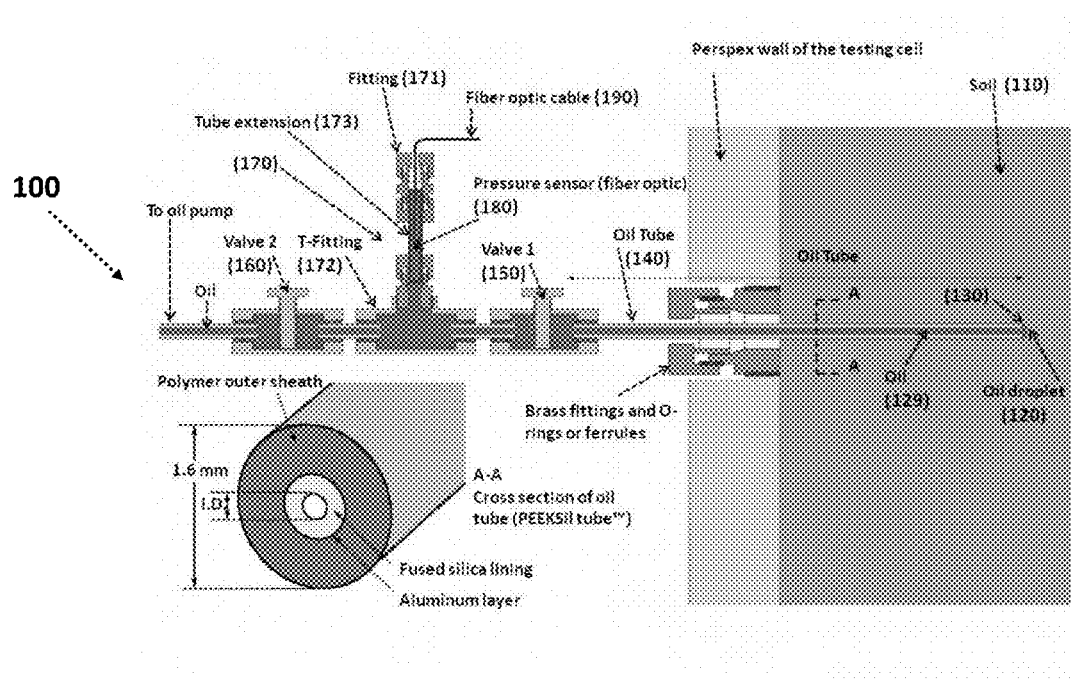
FIG. 1 is a schematic view of a filter less rigid piezometer according to the invention.

FIG. 1 shows an embodiment of a FRP 100 according to the invention. The interface of the piezometer fluid, such as oil, with the pore fluid, such as water, is within a porous media, such as soil 110, and uses an oil (as a piezometer fluid) droplet 120 injected into the soil (an example of a porous media) through the end 130 of an oil tube 140. The volume of the droplet 120 is three to five times greater than the volume required to transfer the pressure, and may be slightly greater than four (4) times that volume. Other volumes of droplet might be used for other applications. The droplet 120 also acts as an oil cap for the tip of the oil tube (which could be a polymer tube with a silica lining, such as those sold under the trade-mark PEEKsil) which prevents flow of free air into FRP 100. The oil-saturated soil around the end 130 of the FRP 100 acts as a filter for the FRP 100 (in the sense of separating total pressure from pore pressure); so this filter has the same pore-size, hydraulic conductivity, and deformation characteristics as the soil itself and does not trap air bubbles inside the piezometer; hence, it does not alter the measured pore pressures.

When the piezometer is used for measuring pore pressures at subfreezing temperatures of the pore-fluid, the piezometer fluid should not freeze at a freezing temperature of the pore-fluid (the temperatures below the temperature at which the pore-fluid would freeze when it is not within the porous medium). The piezometer fluid also should not affect the freezing temperature or chemistry of the pore fluid. For measuring pore-water pressure in partially frozen soils, the piezometer fluid should not freeze at temperatures of interest below 0° C. The mineral oil, used as hydraulic fluid in one of the FRP prototypes of this invention, does not freeze at temperatures below 0° C. down to −30° C., is not toxic, and does not change the chemistry of pore-water for geotechnical engineering purposes (for example as compared to alcohol or glycol).

When the piezometer is used to measure negative pore-liquid pressures, the piezometer fluid should be able to sustain negative pressures less than cavitation pressure of the pore-fluid. When the pore-liquid is water, the piezometer fluid should sustain negative pressures less than the cavitation pressure of water (for example less than about −90 kPa at 20° C.) without cavitation. Mineral oil, used as hydraulic fluid in an embodiment of the invention, can sustain negative stresses of less than −500 kPa.

Valves 150 and 160 control the oil flow in oil tube 140 and assembly 170 and into the soil 110. Assembly 170 provides a T connection so that pressure transducer/sensor 180 (which may be a very sensitive small pressure sensor that requires very low volume transfer to measure pressure—typically a miniature or micro-sized fiber optic pressure sensor) can measure oil pressure in assembly 170 that is connected to the oil in the oil tube 140 and droplet 120. Pressure sensor 180 should have low volume transfer requirements to measure pressure and should be immune to electromagnetic interference.

The operation of FRP 100 begins with filling oil tube 140, valves 150 and 160, and assembly 170 with oil or another hydraulic fluid (i.e. all the space inside the tubing system of the FRP 100 is completely filled with oil and is de-aired). Then both valves 150 and 160 are opened and a droplet 120 is injected into the soil 110 using a syringe pump (not shown) which applies a controlled pressure or controlled flow rate to the oil at the side of the valve 160 to make the oil flow into the soil to generate a droplet 120. Then, this valve 160 is closed and valve 150 stays open so that pressure sensor 180 is hydraulically connected to oil droplet 120 and can measure the pore pressure in soil 110.

Piezometer 100 may be insulated by insulation and/or encapsulated in a thermal mass to delay and/or dampen thermal fluctuations which otherwise may impact the accuracy and rigidity of piezometer 100.

The rigidity of FRP 100 is achieved by the following factors, any or all of which may be present in piezometer 100: 1. Very small components may be used hence minimizing the volume of piezometer fluid inside piezometer 100; 2. A miniature fiber optic pressure sensor 180 may be used that requires a very small amount of volume transfer to measure the pressures; 3. A filter component is not needed in piezometer 100 for the purposes that filter had been previously used in prior art piezometers. A filter might be used as means to prevent oil tube from plugging; however, in such case, the interface of the piezometer fluid and the pore-fluid should be outside of this filter and inside the soil and such filter should have pore size not smaller than the soil's pore size and be positioned in such a way as to not delay or alter measured pore pressures; 4. The piezometer fluid is treated as a hydraulic fluid allowing hydromechanics to be used for increasing rigidity of the hydraulic system of piezometer 100; 5. Injection of a droplet 120 of piezometer fluid at the end 130 of tube 140 thereby pushing the interface of the piezometer fluid and the pore-fluid into soil 110 prevents free air from entering piezometer 100 and provides hydraulic continuity between piezometer fluid and pore-fluid; 6. The use of tubes 140 with a very smooth interior that allows very smooth fluid flow inside piezometer 100; and/or 7. The use of thermal insulation and/or thermal mass delays and/or dampens thermal effects on piezometer 100.

The thermal insulation and/or thermal mass, delay and slow down the thermal expansion and contraction of piezometer 100, and this allows time for piezometer fluid to transfer the pressures to the pressure transducer in FRP for accurate pressure measurements.

The rigidity of FRP 100 means that thermal fluctuations may affect the accuracy of the measurements, if FRP 100 is not properly protected against such fluctuations. Thermal mass and insulation are used to provide protection against thermally induced fluctuations so that FRP 100 can measure transient pore-pressures accurately. This ensures that the rigidity of the FRP 100 is maintained by allowing time for pressure in piezometer fluid to reach equilibrium with pore-fluid during a thermal event.

Figure 2:
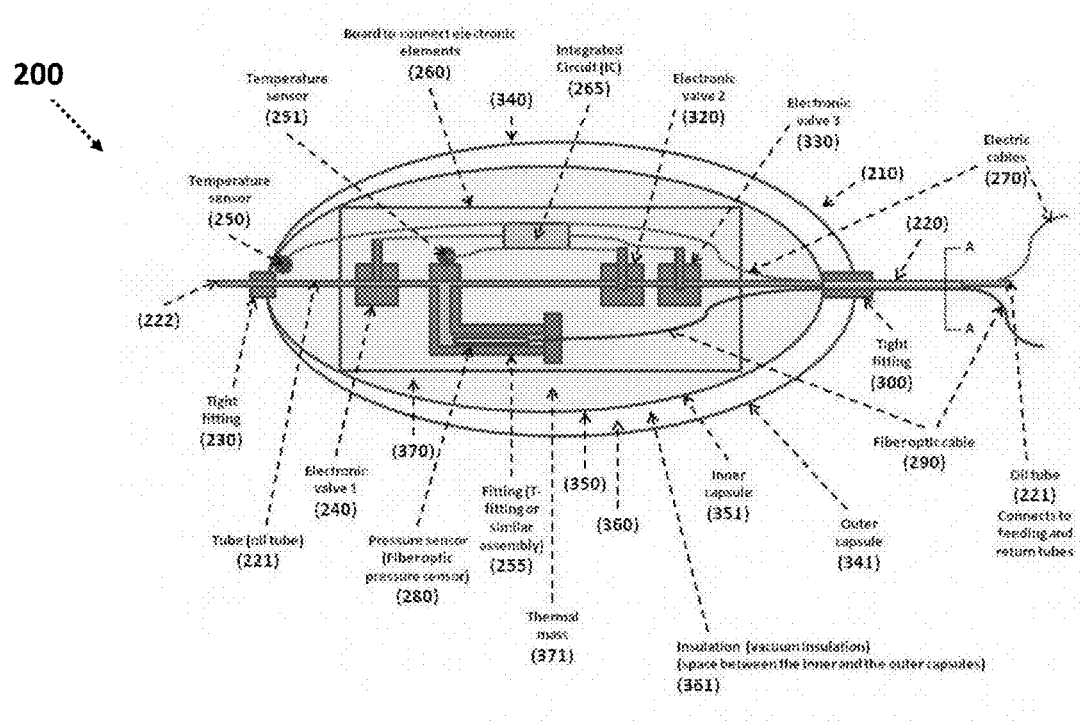
FIG. 2 is a schematic view of an embodiment of an ovoid filter less rigid piezometer according to the invention.

As shown in FIGS. 2, 2.*a* and 2.*b*, an embodiment of an FRP 200 according to the invention includes a vacuum insulated metal capsule 210. Capsule 210 may be ovoid shaped.

FRP 200 includes a tube 221 for transfer of oil, which meets feeding tube 227 and return tube 225 in tube 220 prior to entering capsule 210. Within tube 220 is tube 221 for transferring oil or another hydraulic fluid. The tip 222 of tube 221 exits capsule 210 into the soil, at a tightly sealed air tight aperture 230. The tip 222 of tube 221 at exit 230 is where the oil droplet will be generated for pore pressure measurement. A first electronic valve 240 is present to control the oil flow into the soil and electronic valves 320 and 330 control the oil flow into the line where fiber optic sensor 280 is and then into the soil. Oil provides hydraulic continuity to transmit the pressures to the fiber optic pressure sensor 280. Temperature sensors 250 and 251 are present and positioned near aperture 230 and fitting 255, respectively. Sensor 250 measures soil temperature and sensor 251 measures inside temperature and the difference between these two measurements indicates the level at which the insulation and thermal mass are dampening and delaying the thermal fluctuations. Circuit board 260 mounts integrated circuit 265 which controls the electronic components, including valves 240, 320 and 330, and temperature sensors 250 and 251 and is connected to a data acquisition system or data logger (not shown) for power and information transmission by electric cable(s) 270. The fiber optic pressure sensor 280 is connected to the data acquisition system through fiber optic cable 290. The oil tube 221, the electrical cable(s) 270, and fiber optic cable 290 are grouped into tube 220 which exits capsule 210 at a tightly sealed air tight aperture 300. The extension of tube 220 after exit 300 may also contain the connection of tube 221 with the feeding tube 227 and return tube of 225 at the U-shaped connection 228.

Fiber optic pressure sensor 280 is positioned within fitting 255, and is connected to fiber optic cable 290, which runs inside tube 220 with electric cables 270, and exits capsule 210 though a second tightly sealed airtight aperture 300. Second electronic valve 320 and third electronic valve 330 are positioned along tube 221 to control the oil flow therein.

Capsule 210 has an outer metal layer 340 and an inner metal layer 350. The cavity 360 between inner metal layer 350 and outer metal layer 340 contains a vacuum. The vacuum provides thermal insulation. The components that are installed on the board 260 are within the cavity 370 of the inner metal layer within capsule 210 and the remainder of cavity 370 is filled with a mixture of a liquid and air, for example 85% oil and 15% air, to provide a thermal mass that will further dampen thermal fluctuations. The liquid acting as thermal mass should have a high thermal capacity, not change phase, and not expand or contract too much (for example beyond the 15% air volume mentioned above), within the operating temperatures of the piezometer.

Capsule 210 minimizes the effects of thermal fluctuations by delaying and dampening such changes in temperature. This provides time for the pore-fluid to transfer the pressures (that are representative of pore pressures in the soil) to fiber optic pressure sensor 280. Capsule 210 allows more time for the fluid in FRP 200 and oil droplet to reach equilibrium with the pore fluid pressure in the soil.

Capsule 210 also nullifies the effect of electromagnetic interferences on FRP 200. The electromagnetic effect can be further minimized by short-circuiting electronic valves 240, 320, and 330, when valve 240 is open and valves 320 and 330 are closed. This will cause valves 240, 320 and 330 to remain in the same open or closed position even in the case of electromagnetic incidents, such as during lightning. Circuit board 260 and integrated circuit 265 would control this process. The short-circuiting status will continue even if the integrated circuit 265 gets damaged during an electromagnetic incident. Valve 330 mirrors the status of valve 320 and thereby provides redundancy, i.e. both valve 330 and valve 320 would be closed or open at the same time.

In another embodiment of the invention, capsule 210 may be cylindrical, rather than ovoid. Furthermore, instead of a vacuum between inner layer 350 and outer layer 340, another type of insulation may be used, such as Styrofoam or air bubbles encapsulated in polymers, etc.

To provide a buried FRP 200, capsule 210 can be embedded in the ground or embankment, or grouted within a borehole, as needed. Electric signals to control the valves 240, 320, 330 can be provided from a data logger or data acquisition system which also collects data from the temperature sensors 250 and 251. The pressure data from fiber optic sensor 280 is transmitted to a data logger or data acquisition system via fiber optic cable 290. Tube 221 connects to feeding tube 227 which leads to a syringe pump (not shown), which may be located above the ground level. A return oil tube 225 may be used to circulate oil in tubes 227 and 225 and hence de-air the oil tube 227 before it connects to tube 221 and oil enters FRP 200. An oil droplet is injected from the tip of tube 221 at tip 222 into the soil only after FRP 200 is embedded. After the oil droplet is injected and valves 320 and 330 are closed, the syringe pump can be disconnected from FRP 200. Additional valves (not shown) at the ends of the tubes 225 and 228 (where tubes 228 and 225 are connected to a syringe pump or oil container, respectively) may be used. Tube 220 contains a resin fill 275 which seals tube 220 and protects tubes 221, 225, 227, and cables 270 and 290.

Figure 3:
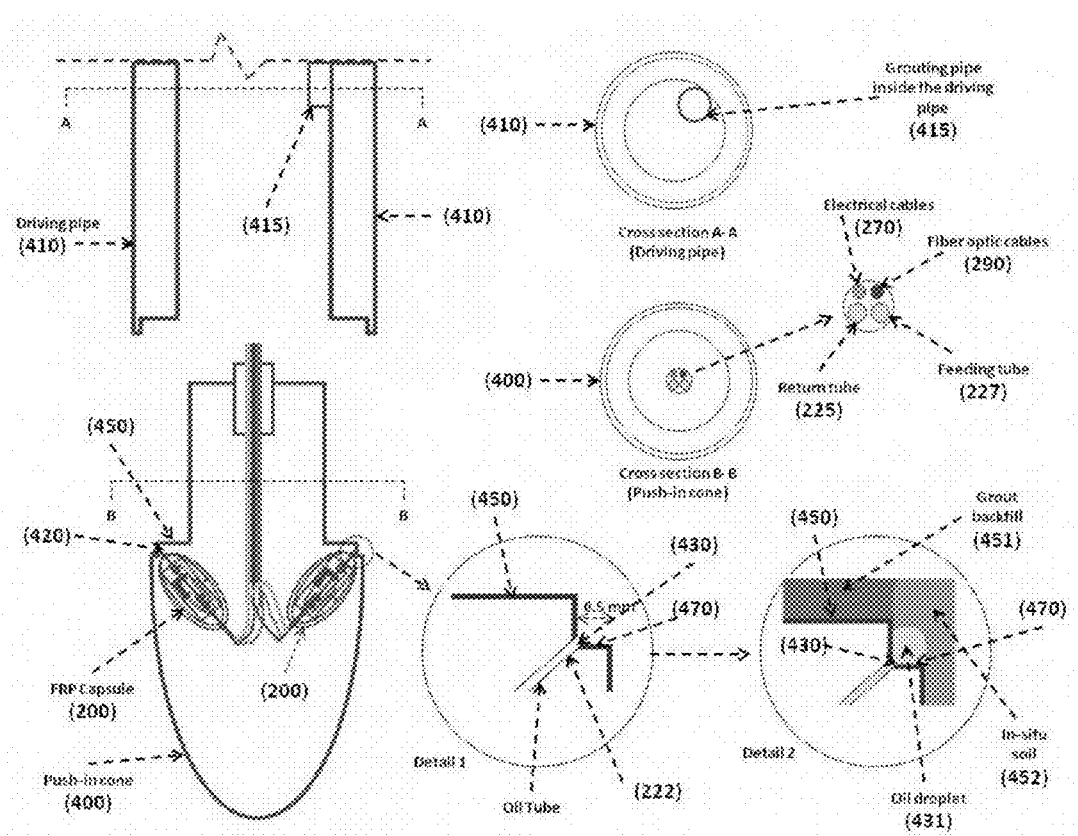
FIG. 3 is a schematic view of an embodiment of a push-in buried filter less rigid piezometer according to the invention.

As shown in FIG. 3, FRP 200 may be enclosed in a driving cone 400. Driving cone 400 may be pushed into the ground using metal driving pipe 410. A borehole may be bored to the desired depth before pushing the driving cone 400 to the appropriate location. Driving cone 400 has two tiered edges: upper edges 450, and lower edge 470. Driving pipe 410 is shaped to cover apertures 420, 430 on each side of cone 400. Fiber optic cables 290, electrical cables 270, and feed and return oil tubes 227 and 225 lead through cone 400 to the top of cone 400. When cone 400 is positioned at its final location, grout is injected through grout pipe 415 within driving pipe 410, while the driving pipe is being retrieved, leaving the cone 400 in the ground. The grout covers the top of the edge 450 and seals the borehole. Lower edges 470 should be sufficiently small (for example 0.5 mm) so that natural soil will heal back to come in contact with the cone 400 wall and cover apertures 420, 430, while the driving pipe is being retrieved. Oil droplets will be injected through apertures 420 and 430; hence the natural soil surrounds the oil droplet injected into the soil. If the natural soil does not heal back, the space above ledge 470 will be filled with grout, which should be a slurry of the in-situ soil or a similar mix.

In the embodiment show in FIG. 3, two FRPs 200 are shown, although more may be present for redundancy, or alternatively, only one may be used.

Figure 4:
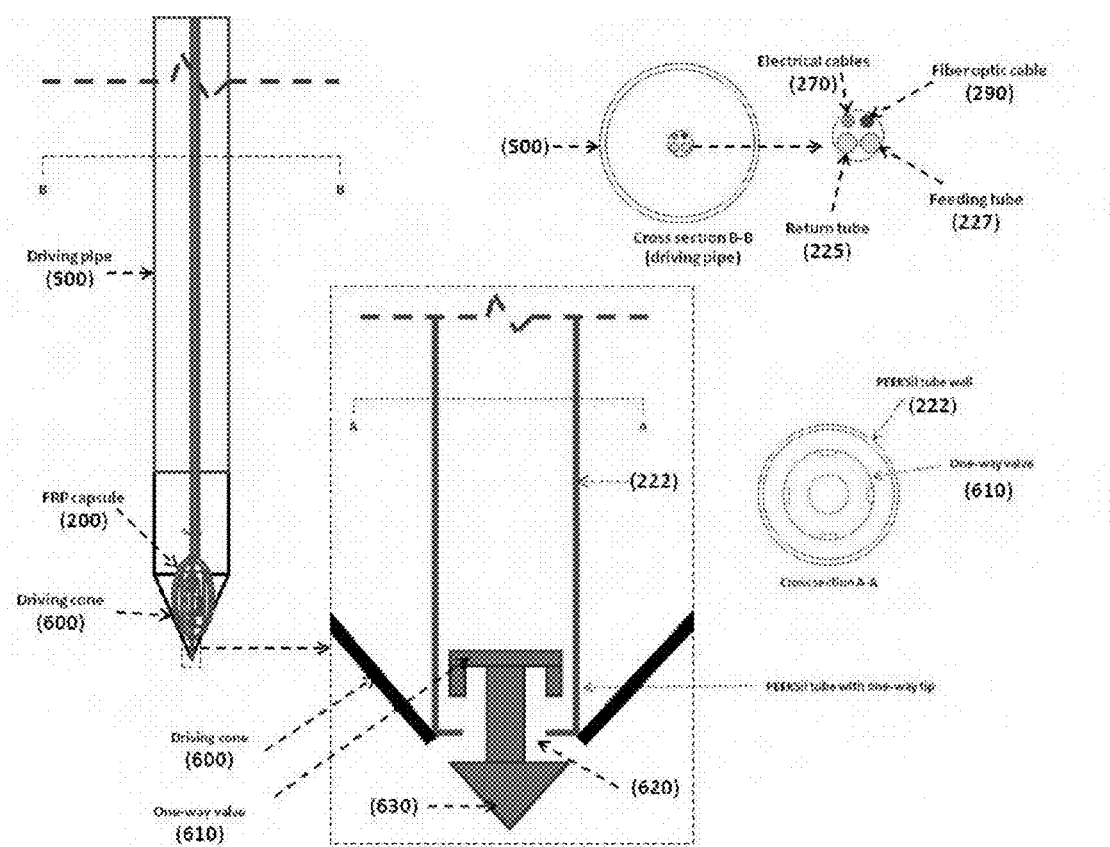
FIG. 4 is a schematic view of an embodiment of a retrievable push-in filter less rigid piezometer according to the invention.

As shown in FIG. 4, FRP 200 may be enclosed in a retrievable push-in driving cone 600, which is particularly useful for measuring pore-water pressure in shallow thawing slopes within an active layer. The retrievable push-in cone 600 is secured to a driving pipe 500 (for example screwed) and penetrated into soils at a shallow depth. After the tip 630 of cone 600 is at the desired depth, an oil droplet is injected into the soil and valves 320 and 330 will be closed and syringe pump can be disconnected. If further injections are necessary, syringe pump can be reconnected and another oil droplet can be injected (after tube 227 and 225 are flushed with de-aired oil).

FRP 200 is positioned at the entry point of driving cone 600. In this embodiment opening 620 includes one way conical valve 610 which prevents plugging of tube tip 222 during entry into the ground. Valve 610 allows injection of the oil droplet after cone 600 has been driven into the ground. The tip 630 of valve 610 will be pushed out during the oil injection thereby allowing the oil injection into the soil. If the soil is too stiff to allow movement of the tip 630, then driving pipe 500 can be raised slightly (for example, about 0.1 mm) which will provide space for the oil droplet to pass valve 610 and establish continuity of the pore-fluid and piezometer fluid.

While the above description has been in the context of determining pore water pressure in partially frozen soils and for geomechanical purposes, for example for the mining, transportation, slope stability, and oil and gas sectors, the filter-less rigid piezometer according to the invention could be used for other purposes, including but not limited to: winter construction, for example monitoring tailings dams and embankments; measuring pore pressures in shale and other porous rock formations; or micro and mini sized filter-less rigid piezometers could be used for dynamic wave research in soils and rocks during earthquakes, soil liquefaction, blasting in open pit mining and underground mining.

Freezing and thawing mechanics are also of interest in artificial ground freezing for groundwater and contamination transport control, deep and shallow excavation support, and liquid natural gas (LNG) storage. The effects of freeze-thaw cycles not only are of great concern in geotechnical engineering but also for food preservation, cryosurgery; cryo-preserving biological cells, preserving human organs for implantation; soil sciences for agricultural purposes, and masonry and the mortar industry. Moreover, geomorphic development within the Arctic and Alpine areas including patterned ground formation, size sorting in soils, uplifting of stones by freezing, and frost weathering of rocks, are all related to frost heave, ice segregation and thaw deformations.

The above-described embodiments have been provided as examples, for clarity in understanding the invention. A person of skill in the art will recognize that alterations, modifications, and variations may be effected to the embodiments described above while remaining within the scope of the invention as defined by the claims appended hereto.

What is claimed is:

1. A piezometer comprising:
   an oil tube;
   first and second valves to control oil flow in the oil tube and into a porous medium;
   a housing, and a fitting within the housing wherein a pressure sensor is positioned to measure oil pressure that is connected to the oil in the oil tube and an oil droplet injected from an end of the oil tube into the porous medium; and
   an interface of oil with pore water, the interface within the porous medium, using the oil droplet injected into the porous medium.

2. The piezometer of claim 1 wherein the volume of the oil droplet is between three to five times the volume that is required to transfer the pressures.

3. The piezometer of one of claim 1 wherein the oil droplet prevents flow of free air into the oil tube.

4. The piezometer of claim 1 wherein after the oil tube is filled with oil, an oil droplet is injectable into the porous medium by opening the second valve, the second valve connecting the piezometer fluid inside the piezometer to a piezometer fluid source, and opening the first valve thereby allowing the flow of piezometer fluid inside the piezometer into the porous medium.

5. The piezometer of claim 1 wherein after the oil tube is filled with oil, both first and second valves are closable and an oil droplet is injectable by opening the first valve only, thereby depressurizing pre-pressurized oil contained between the two valves.

6. The piezometer of claim 3 wherein after the oil droplet is injected, the second valve is closed and the first valve is openable so that the pressure sensor is hydraulically connected to the oil droplet and measures the pore pressure in the porous medium.

7. The piezometer of claim 1 wherein the piezometer is insulated by insulation and is encapsulated in a thermal mass to delay and dampen thermal fluctuations.

8. A piezometer, comprising:
   a housing, said housing having an insulating layer, said housing having first and second airtight openings,
   a tube for transmission of oil, said tube ending at said first airtight opening, said tube passing through said second airtight opening;
   first and second valves within said housing, positioned on said tube, said first and second valves configured to control a flow of oil in said tube;
   an integrated circuit within said housing configured to control said first and second valves; and
   a fiber optic pressure sensor within said housing configured to measure pore pressure, said pressure sensor in communication with a data acquisition system by means of a fiber optic cable passing through said second opening.

9. The piezometer of claim 8 wherein said housing is cylindrical.

10. The piezometer of claim 8 wherein said housing is ovoid shaped.

11. The piezometer of claim 8 further comprising a third valve positioned on said tube configured to control oil flow through said tube.

12. The piezometer of claim 8, wherein said housing comprises first and second metallic layers and said insulting layer comprises a vacuum between said first and second metallic layers.

13. The piezometer of claim 8 wherein in operation, said first valve opens to allow oil to flow to and from said tube ending at said first opening, and said second valve closes to prevent said oil flow from returning, thereby causing the oil in the said oil tube to be in contact with oil droplet outside the said housing.

14. The piezometer of claim 8, wherein said housing is positioned within a driving cone, said first opening positioned at a corner of between first and second ledges of said cone, said second ledge positioned below said first ledge.

15. The piezometer of claim 14 wherein said cone is positioned in the ground by means of a driving pipe, said driving pipe having a flange shaped to cover said first opening during driving.

* * * * *